United States Patent Office 3,532,645
Patented Oct. 6, 1970

3,532,645
CATALYST AND PROCESS FOR THE POLYMERIZATION OF ETHYLENE OXIDE
Heinz Schulze, Howard Paul Klein, and George Phillip Speranza, Austin, Tex., assignors to Jefferson Chemical Company, Inc., Houston, Tex., a corporation of Delaware
No Drawing. Filed Nov. 7, 1968, Ser. No. 774,202
Int. Cl. C08g 23/06
U.S. Cl. 260—2          5 Claims

ABSTRACT OF THE DISCLOSURE

A catalyst for use in the polymerization of ethylene oxide is prepared by contacting an alkaline earth metal hexammoniate with a cyclic imino ether in the presence of an excess of liquid ammonia at conditions such that the ammonia remains in the liquid state. This catalyst preparation may also be carried out in the presence of a normally liquid inert hydrocarbon solvent. Ethylene oxide is polymerized in the presence of this catalyst to give a white, free-flowing solid having a molecular weight from 100,000 to about 4,000,000.

BACKGROUND OF THE INVENTION

This invention relates to the polymerization of ethylene oxide and the preparation of a composition which is catalytically active for the polymerization.

Previously, various divalent alkaline earth metal oxides, carbonates, alcoholates, and mixtures thereof, have been known to be useful as catalysts for the polymerization of ethylene oxide. As described in U.S. Pat. 2,969,402 and U.S. Pat. 3,037,943, alkaline earth metal hexammoniates modified by the addition of olefin oxides and saturated aliphatic hydrocarbon nitriles are known to also catalyze the polymerization of ethylene oxide.

Polymerization catalysts are used to produce granular poly(ethylene oxide) by one of the known techniques of polymerization, i.e., bulk polymerization, solution polymerization or suspension polymerization. Bulk polymerization refers to polymerization in the absence of a solvent and produces a nongranular, resinous poly(ethylene oxide) mass which must be modified by mechanical means to produce a free-flowing granular product. Similar mechanical means are necessary if the poly(ethylene oxide) is formed by the solution polymerization technique wherein both the reactant ethylene oxide and the polymer product are soluble in the diluent used as the reaction medium. The suspension method which has been preferred for the production of granular material involves using as a diluent in the reaction medium an inert, normally liquid organic hydrocarbon in which the ethylene oxide monomer is soluble and the resulting polymer is insoluble. This allows for recovery of the granular polymer by a simple decantation or filtration.

Ethylene oxide polymers have been found to be useful as coagulants and water-soluble lubricants. These materials are completely soluble in water and various organic solvents such as chloroform and acetonitrile form viscous solutions. Therefore, these polymers are useful as paint thickeners and for applications in such products as toothpaste, shampoos, shaving cream, etc. They have also been found to be useful as wrapping films, tablet coatings and binders in the pharmaceutical industry, adhesives, lubricants, mold release agents and as components for other cosmetic formulations.

The early catalysts developed for the polymerization of ethylene oxide left much to be desired in the production of a polymerization product. This led to the production of the class of catalysts wherein an alkaline earth metal hexammoniate was modified by an interaction with a saturated aliphatic hydrocarbon nitrile and an alkylene oxide in the presence of an excess of liquid ammonia to produce another class of catalyst. These catalysts improved the reaction rates but still left much to be desired.

Accordingly, it is the object of our invention to provide a new class of catalyst for use in the production of ethylene oxide polymers and to provide a novel process for polymerizing ethylene oxide. It is a further object of this invention to provide a polymerization catalyst for ethylene oxide which gives increased yields of the poly(ethylene oxide). Another object of our invention is to provide a catalyst which polymerizes ethylene oxide to polymers having wide ranges of molecular weight. Other objects and advantages of our invention will be apparent to those skilled in the art based upon the following complete description and examples of the best mode of practicing our invention.

SUMMARY OF THE INVENTION

Our invention relates to the polymerization of ethylene oxide, the products resulting therefrom and the catalyst used in the polymerization. This catalyst is prepared by contacting an alkaline earth metal hexammoniate in an excess of liquid ammonia with a cyclic imino ether of the formula:

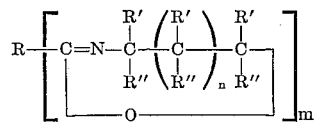

where R is hydrogen or organic radical, preferably a monovalent or divalent organic hydrocarbon radical such as, for example, alkyl, cycloalkyl, aryl, alkaryl, aralkyl, alkenyl, alkylene and the like. R' and R", taken individually, is hydrogen or a lower alkyl group, $n$ is 0 or 1 and $m$ is an integer corresponding to the valence of R and preferably is 1 or 2. The cyclic imino ether is added in the amount of 0.1 to about 1.0 mol per mol of the alkaline earth metal present in the excess liquid ammonia reaction medium. This interaction is carried out at temperatures and pressures wherein the ammonia present remains liquid. After the interaction of the hexammoniate and the cyclic imino ether, the ammonia is evaporated leaving behind a powdery substance which is catalytically active for the polymerization of ethylene oxide.

The interaction between the hexammoniate and the cyclic imino ether can occur also in the presence of an inert normally liquid hydrocarbon solvent which is unreactive to the materials present and which is in the liquid state under the conditions at which the ammonia is in the liquid state. The ammonia is evaporated, leaving a slurry of the catalytic compound in the solvent which could also be later used as the solvent for a suspension polymerization of the ethylene oxide.

Our catalyst produces poly(ethylene oxide) having molecular weights which may vary from about 100,000 to about 4,000,000.

DESCRIPTION OF THE INVENTION

An alkaline earth metal hexammoniate is prepared by dissolving an alkaline earth metal in an excess of liquid ammonia at a temperature and pressure at which the ammonia remains in its liquid state. This is conveniently done using a Dry Ice-isopropanol slush bath to cool the reactants. The reaction media is agitated to hasten solution. A deep blue color appears, demonstrating that an alkaline earth metal hexammoniate has been prepared.

The alkaline earth metals useful for the practice of our invention are those appearing in Class II of the Periodic Table of Elements and having an atomic number greater than 11 and less than 57. The alkaline earth metals especially preferred for the practice of our invention are calcium, strontium and barium.

To the alkaline earth metal hexammoniate solution in the excess liquid ammonia is added the cyclic imino ether described by the formula:

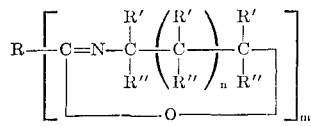

In a preferred aspect the organic radical R is hydrogen or an aryl, alkyl or alkylene radical having 1–18 carbon atoms. Some representative R radicals include, among others, methyl, ethyl, propyl, isopropyl, butyl, isobutyl, t-butyl, 2-ethylhexyl, decyl, dodecyl, cyclopentyl, cyclohexyl, 2-methylcyclopentyl, ethylene, propylene, butylene, hexamethylene, phenylene, phenyl, benzyl, totyl, ethylphenyl, phenylethyl, hexylphenyl, phenylpropyl, phenylbutyl, butylphenyl, allyl, 3-butenyl, 3-pentenyl, nonylphenyl, and the like. Also, the R radical may contain unreactive groups or atoms, or groups which do not materially affect the polymerization reaction, such as, for example, aromatic halogen atoms, a lower alkyl branched chain on the alkylene groups or aromatic nitro groups, or the like.

R' and R'', taken individually, may be hydrogen or lower alkyl groups, $n$ is 0 or 1 and $m$ is an integer corresponding to the valence of R and is preferably 1 or 2. By lower alkyl group is meant an alkyl group having from 1 to about 4 carbon atoms.

The preparation of the cyclic imino ether is a well known process. See, for example, Heterocyclic Compounds, R. C. Elderfield, ed., vol. 5, John Wiley & Son, Inc., 1957.

The interaction between the alkaline earth metal hexammoniate contacted with the cyclic imino ether is conducted at temperature and pressure conditions such that substantially all the ammonia remains in the liquid state. Any interrelation of temperatures and pressures at which ammonia maintains its liquid state is perfectly suitable for the practice of producing the catalyst of our invention.

While adding the cyclic imino ether, the hexammoniate/ammonia solution is preferably agitated, and it will be observed that a gray suspension results in the excess liquid ammonia and the blue color disappears. The ammonia is then evaporated, leaving a fine, gray-white powder after the excess ammonia is gone. Since oxygen and moisture in the atmosphere damage the catalyst, it is preferable to suspend the gray-white powder, which is catalytically active for the polymerization of ethylene oxide, in a dry, inert, normally liquid hydrocarbon solvent.

Alternatively, the alkaline earth metal hexammoniate itself can be formed in the presence of an inert, normally liquid hydrocarbon medium following the same criteria of temperature and pressure as mentioned above. After the alkaline earth metal is dissolved in the ammonia, then the cyclic imino ether is added. Then the ammonia is allowed to evaporate, leaving the gray-white, solid catalyst complex suspended in the solvent.

Another alternative of catalyst preparation when a polymer is desired to have a higher molecular weight, say from about 2,000,000 to about 4,000,000, is to place the alkaline earth metal in the solvent and then condense the ammonia in it to dissolve the metal. This is followed by the addition of the cyclic imino ether and catalyst slurry recovery as described above.

Suitable diluents or solvents are those normally liquid organic compounds which are unreactive with any other components of the reaction mixture and which are liquid at the temperatures and pressures at which the ammonia is a liquid. Illustrative solvents suitable for the preparation of the catalyst of our invention are the normally liquid, saturated hydrocarbons, for example, saturated aliphatic hydrocarbons, saturated cycloaliphatic and alkyl-substituted cycloaliphatic hydrocarbons, various normally liquid saturated ethers and the like. Specific examples of preferred solvents include, among others, hexane, heptane, isoheptane, ethylpentane, the octanes, the decanes, various petroleum hydrocarbon fractions, cyclohexane, alkyl-substituted cyclohexanes, decahydronaphthalene, and the like. Other illustrative solvents which may be employed include diethyl, dipropyl, dibutyl and higher dialkyl ethers, dioxane, and the like. The same diluent or solvent may be used in the catalyst-forming steps which is later used in the polymerization of ethylene oxide itself, thus having the advantage of always protecting the catalyst composition from damage by contact with air or moisture in the air and obviating the necessity of suspending the dry catalyst in a hydrocarbon material after the evaporation of the excess ammonia present in a reaction medium.

The cyclic imino ethers useful for the preparation of the novel catalyst of our invention for the polymerization of ethylene oxide include either five or six-membered rings as indicated by the above formula. These cyclic imino ethers are known as oxazolines or oxazines and, as a class, have been discovered by us to be useful in preparing catalysts for the polymerization of ethylene oxide. The No. 4, 5 and 6, when applicable, ring atoms (numbering the oxygen atom "1" and continuing toward the nitrogen atom and around the ring) may be substituted with lower alkyl groups, but it is preferred that R' and R'' in the formula be hydrogen. Some specific examples of preferred cyclic imino ethers are 2-methyl-2-oxazoline, 2-ethyl-2-oxazoline, 2-propyl-2-oxazoline, 2-isopropyl-2-oxazoline, 2-t-butyl-2-oxazoline, 2,5-dimethyl-2-oxazoline, 2-methyl-5-ethyl-2-oxazoline, 2-ethyl-5-methyl-2-oxazoline, 2-benzyl-2-oxazoline, 2-methyl-2-oxazine, 2-ethyl-2-oxazine, 2,4-diethyl-2-oxazoline, 2,4,4-trimethyl-2-oxazoline, 2-phenyl-2-oxazoline, 2-methyl-2-oxazoline, 2,2'-tetra-methylene - bis-(5-methyl-2-oxazoline), 2,2'-p-phenylene-bis-(2-oxazoline), and the like.

The cyclic imino ether is contacted with the alkaline earth metal hexammoniate such that 0.1 to about 1.0 mol of the cyclic imino ether is present per mol of the metal present in the liquid ammonia medium. It is preferred that the cyclic imino ether be present in the amounts of 0.4 to about 0.7 mol per mol of the alkaline earth metal, and it is especially preferred that the mol ratio be about 0.5 mol of the cyclic imino ether per mol of the alkaline earth metal hexammoniate. Of course, more than 1.0 mol may be used, but no useful purpose would be served thereby. In fact, catalytic activity of our novel catalyst was found to decrease when more than 1.0 mol per mol is used.

Using the catalyst prepared by the method of our invention, we are able to produce poly(ethylene oxide) having a molecular weight within the range of about 100,000 to about 4,000,000, and particularly in the range of about 250,000 to 3,500,000.

As hereinbefore mentioned, we have discovered that the higher molecular weight polymers, say from about 2,000,000 to about 4,000,000 are prepared by using the novel procedure of placing the alkaline earth metal in the normally liquid organic solvent which is to be the reaction medium and dissolving the metal by condensing ammonia into the solvent. After the metal is dissolved and an excess of liquid ammonia is present, the cyclic imino ether is introduced as previously, with mixing until the interaction has occurred between the cyclic imino ether and the alkaline earth metal hexammoniate formed by dissolving the metal in the ammonia. The excess ammonia is then evaporated to leave a catalyst slurry which will polymerize ethylene oxide to the higher molecular weight range.

The catalyst to produce poly(ethylene oxide) of the lower molecular weight range, say 100,000 to about 2,000,000, is prepared by adding the alkaline earth metal to the excess liquid ammonia already in the reaction vessel. The reaction occurring is either performed alone or in the presence of a solvent, and proceeds as hereinbefore described to recover the catalytically active residue.

The structure of the catalyst of our invention is not specifically known but it is believed that the cyclic imino ether and the alkaline earth metal hexammoniate form a complex which is a solid after the excess liquid ammonia is evaporated.

In the polymerization of ethylene oxide the catalyst is employed in catalytically sufficient quantities. In general, a catalyst concentration in the range of about 0.02 wt. percent to about 10 wt. percent, based upon the weight of the total epoxide compound in the feed is suitable. While less than 0.02 wt. percent concentration may provide some polymer production, the yields are low and the reaction proceeds more slowly. Amounts greater than 10 wt. percent may be used, but no practical purpose is served thereby. A catalyst concentration of from about 0.1 to about 3 wt. percent is preferred with the temperature and other polymerization conditions being largely determined by the concentration of the catalyst which is used.

The polymerization reaction can be conducted over a wide temperature range. Depending upon various factors such as the concenrtation of the catalyst and the like, the reaction temperature can be as low as −30° C. and as high as 150° C. with a suitable range from about 0° C. to about 85° C. Since the poly(ethylene oxide) usually becomes rather soft and sticky at from about 65° C. to 70° C., it is preferable that ethylene oxide be polymerized to granular poly(ethylene oxide) at a temperature of from about 10° C. to about 65° C. in order that this softening of the granular product does not occur. The polymerization reaction has been found to proceed quite well at ambient temperature conditions.

In general, the reaction time will very depending upon the operating temperature, the particular catalyst employed and the concentration of the catalyst. This reaction time can be measured in the terms of minutes in duration or it can be as long as several days. However, we have found that under most conditions a reaction time of 5 to 25 hours is sufficient and preferably employed.

The polymerization reaction preferably takes place under anhydrous conditions and generally in the presence of an organic, normally liquid organic diluent. As hereinbefore described, the polymerization can be by either bulk polymerization, suspension polymerization or solution polymerization technique with the suspension polymerization being especially preferred. Suspension polymerization is carried out in the presence of an inert, normally liquid organic diluent in which the ethylene oxide monomer is soluble, but the granular polymer formed is insoluble. This permits intimate contact of the monomer with the catalyst and also eases recovery of the polymer from the reaction mixture.

The amount of solvent may vary widely, and it is not necessary to limit the amount by the solubility of ethylene oxide therein since an excess of ethylene oxide may be used whereby the reaction is conducted in the liquid phase under an atmosphere of ethylene oxide.

One preferred method for producing the granular poly(ethylene oxide) is to feed the ethylene oxide into the stirred solvent containing the polymerization catalyst of our invention at a reaction temperature below the softening point of the granular polymer product. The ethylene oxide is fed into the stirred solvent where it contacts the catalyst, and unreacted ethylene oxide, if any, is allowed to pass through the reaction mixture and may be either vented or refluxed by an appropriate condenser attached to the reaction vessel. The reaction mixture is stirred to maintain the catalyst in suspension. The reaction proceeds readily under wide conditions of pressure and temperature and it is highly desirable to conduct the suspension polymerization reaction under a blanket of nitrogen gas or ethylene oxide when excess ethylene oxide is used. Care is taken to exclude oxygen, carbon dioxide and moisture since the catalyst and/or product may be damaged. The process of our invention may be conducted as a batch, semi-continuous, or a continuous process.

We have discovered that using the catalyst of our invention, by our process, wide molecular weight range of polyethylene oxide can be produced varying within the range of 100,000 to about 4,000,000 and particularly within the range of 250,000 to about 3,500,000. The molecular weight range varies somewhat with the particular cyclic imino ether used and the method of catalyst preparation used as hereinbefore described.

In the illustrative examples which follow, the catalyst preparation and polymerization reaction were conducted at substantially anhydrous conditions in an atmosphere substantially free of carbon dioxide, water and oxygen. Exposure to the atmosphere was avoided throughout the process.

The molecular weights of the polymers produced in the following examples were determined from viscosity measurements in water at 30° C. Samples were dissolved in water by stirring overnight, then diluted to concentrations between 0.1 wt. percent and 0.5 wt. percent. Flow times for these solutions through a calibrated Ostwald viscometer were recorded and the reduced viscosities were calculated according to the relationship:

$$n_{\text{red}} = \frac{n - n_0}{n_0 C}$$

Where $n_{\text{red}}$=reduced viscosity; $n_0$=flow time of pure solvent, sec.; $n$=flow time of solution, sec.; $c$=conc. of polymer in gms./dl.

Straight line plots of reduced viscosity versus concentration were extrapolated to zero concentration to obtain the intrinsic viscosity $(n)$. For polymers of ethylene oxide produced using the catalyst of our invention, the relationship of molecular weight to intrinsic viscosity (measured in water at 30° C.) is expressed as follows:

$$(n) = 1.25 \times 10^{-4} M^{0.78}$$

where $(n)$=intrinsic viscosity in deciliters/gram; M=molecular weight in grams/mol.

All molecular weights of the following examples were obtained using the above equation; however, no correction was made for shear rate.

Although the invention is illustrated by the following examples, the invention is not to be construed as limited to the materials and conditions employed in said examples, but rather our invention encompasses the generic scope as hereinbefore disclosed.

EXAMPLE I

Liquid ammonia (250 ml.) was added to a 500-ml., three-necked flask fitted with mechanical stirrer, condenser (Dry Ice) and a gas inlet tube. The flask was cooled in a Dry Ice-isopropanol slush bath (temperature≅60° C.). Calcium metal nodules (4.0 g., 0.1 mol) were then dissolved in the stirred liquid ammonia and the characteristic deep blue color of calcium hexammoniate appeared. To this blue solution was added 6.0 g. (0.0605 mol) of 2,5-dimethyl-2-oxazoline. During the addition the blue color lightened. After the oxazoline was completely added, the ammonia was allowed to evaporate from the system with the aid of a stream of nitrogen. A fine gray-white solid remained after the ammonia had completely evaporated. This powder was covered with 100 ml. of dry cyclohexane and stirred to form a finely divided gray suspension of the catalyst.

To a 24-oz. aerosol bottle was added 400 ml. of dry cyclohexane, 15 ml. of the above catalyst suspension and a magnetic stirring bar. The resulting gray suspension was purged with nitrogen and stirred for 15 minutes. Ethylene oxide (44.0 g., 1.0 mol) was then added in bulk, the bottle tightly sealed and the gray suspension stirred at room temperature for 15 hours.

The bottle was then opened and the gray solid matter was removed from the suspension by filtration. After drying in the air the solid turned white and weighed 35.8 g. (81.3%). The final product was a white, fluffy powder which was completely soluble in water. This polymer had an intrinsic viscosity in water at 30° of 2.60, corresponding to a molecular weight of 340,000.

EXAMPLE II

Into a two-liter resin flask (maintained in a Dry Ice-isopropanol slush bath, the temperature of which was about −70° C.) fitted with a Dry Ice-cooled condenser, mechanical stirrer and gas inlet tube, was condensed approximately 200 ml. of liquid ammonia. Calcium metal nodules (2.0 g., 0.05 mol) were then dissolved in the stirred liquid ammonia while the characteristic deep blue color calcium hexammoniate appeared. To the resulting solution there was slowly added 2.15 g. (0.025 mol) of 2-methyl-2-oxazoline in 50 ml. of dry n-heptane. During the addition of 2-oxazoline the blue color disappeared, leaving a gray-white reaction mixture. Then, 750 ml. of dry n-heptane was added and the Dry Ice bath and condenser removed to expose the flask to room temperature. After about two hours the excess ammonia had evaporated, leaving a gray slurry of the catalyst in n-heptane.

The Dry Ice condenser was then again inserted into the flask and 150 ml., 132 g. (3.0 mols) of liquid ethylene oxide was added in bulk from an addition funnel. The polymerization began right away and was allowed to run overnight while the ethylene oxide refluxed. The reaction temperature remained about 20° C. No external cooling or heating was necessary.

After 15 hours the reaction mixture was filtered and the granular, white polymer was collected. After drying a total of 110 grams of dry, free-flowing, white solid was obtained. This polymer had an intrinsic viscosity in water of 7.40, corresponding to a molecular weight of 1,300,000.

EXAMPLE III

To the equipment described in Example II there were charged one liter of liquid anhydrous ammonia and 20.0 g. (0.5 mol) of calcium metal nodules to form a solution of calcium hexammoniate. The above solution was stirred while 21.5 g. (0.25 mol) of 2-methyl-2-oxazoline was slowly added. Toward the end of the addition the solution turned from deep blue to gray white. Dry n-heptane, 1,250 ml., was added and the excess ammonia was evaporated with the aid of a heat lamp to develop a finely divided suspension of the catalyst.

EXAMPLE IV

To a five-gallon, stainless steel, stirred autoclave, under a nitrogen atmosphere, were added the entire catalyst suspension from Example III and two gallons of dry n-heptane. The autoclave was then closed to the atmosphere and the reaction mixture stirred rapidly while three pounds (1360 g.) of liquid ethylene oxide was added in one-pound increments under nitrogen pressure over a one-hour period. The polymerization was allowed to run overnight with the reactor developing a maximum pressure of 26 pounds and maximum temperature of 42° C. before cooling water (25° C.) was needed. The reactor was opened after 15 hours of stirring. The fine, white, granular solid polymer was removed with several heptane washings, collected on a filter and dried in the vacuum oven at 30° C. A total of 1080 g. of the fluffy, white polymer, which had an intrinsic viscosity in water of 7.15 (approximate molecular weight=1,200,000) was obtained.

EXAMPLE V

To the apparatus described in Example II were charged 100 ml. of anhydrous liquid ammonia and 500 ml. of dry n-heptane to produce a rather cloudy mixture to which was added 2.0 g. (0.05 mol) of calcium metal nodules. A deep blue slurry developed over a 15-minute period. To this slurry was slowly added a solution of 2.55 g. (0.03 mol) of 2-methyl-2-oxazoline while the deep blue collar turned light blue, then gray. More dry n-heptane (500 ml.) was added while the excess ammonia was allowed to evaporate. When the temperature of the catalyst mixture was +17° C., 250 ml. (220 g., 5.0 mols) of liquid ethylene oxide was added quickly through a dropping funnel. The reaction temperature fell to +12° C., then slowly rose to 20.5° C. in 45 minutes. The polymerization proceeded while excess ethylene oxide refluxed overnight. The polymer was a granular, sandy material.

After a 15-hour reaction time, the resin flask was opened and the gray-white, sandy polymer was collected on a filter and dried in a vacuum oven at 30° C. for two hours. A total of 173 g. of white, free-flowing, solid resin was obtained. The above polymer had an intrinsic viscosity in water of 6.60, corresponding to a molecular weight of 1,120,000.

EXAMPLE VI

A catalyst was prepared in Example V except that 4.25 g. (0.05 mol) of 2-methyl-2-oxazoline was added to a slurry of calcium hexammoniate in liquid ammonia n-heptane.

Polymerization of 5.0 mols ethylene oxide with this catalyst after 15 hours gave 90.1 g. of a white, granular polymer having an intrinsic viscosity in water of 4.40, corresponding to a molecular weight of 660,000.

EXAMPLE VII

A catalyst was prepared as in Example V except that 3.0 g. (0.03 mol) of 2.5-dimethyl-2-oxazoline was added to the calcium hexammoniate in place of 2-methyl-2-oxazoline.

Polymerization of 220 g. (5.0 mols) of ethylene oxide with this catalyst gave 126.4 g. of fluffy, white resin after a 15-hour reaction time. The resin had an intrinsic viscosity in water of 5.20, corresponding to a molecular weight of 850,000.

EXAMPLE VIII

A catalyst was prepared as in Example V except that 2.5 g. (0.025 mol) of 2-ethyl-2-oxazoline was added to the calcium hexammoniate slurry in place of 2-methyl-2-oxazoline.

Polymerization of 220 g. (5.0 mols) of ethylene oxide with the above catalyst for 15 hours gave 210 g. of a granular, free-flowing, white resin having an intrinsic viscosity in water of 8.50, corresponding to a molecular weight of 1,600,000.

EXAMPLE IX

A catalyst was prepared as in Example V except that 4.0 g. (0.025 mol) of 2-benzyl-2-oxazoline was added to the calcium hexammoniate slurry in place of 2-methyl-2-oxazoline.

Polymerization of 220 g. (5.0 mols) of ethylene oxide with the above catalyst for 15 hours gave 38 g. of a white, granular polymer which had an intrinsic viscosity value in water of 2.19, corresponding to a molecular weight of 280,000.

EXAMPLE X

To the apparatus described in Example II was added 100 ml. of anhydrous liquid ammonia and 250 ml. of dry n-heptane. To this cloudy mixture was added 2.0 g. (0.05 mol) of calcium metal nodules to form the deep blue slurry of calcium hexammoniate. This slurry was diluted with 750 ml. more of n-heptane before a solution of 2.8 g. (0.05 mol) of 2-propyl-2-oxazoline in 50 ml. of n-heptane was added dropwise. The excess ammonia was allowed to evaporate, leaving a gray slurry of the catalyst in n-heptane.

When the above catalyst mixture temperature reached

+15° C., 240 g. (5.45 mols) of ethylene oxide liquid was added to the flask over a ten-minute period. The polymerization was run for 15 hours at 20° C. After filtration and drying in a vacuum oven, a total of 164 g. of a dry, fluffy powder which had an intrinsic viscosity of 6.80 in water (MW=1,200,000) was obtained.

EXAMPLE XI

A catalyst was prepared as in Example X except that 2.8 g. (0.05 mol) of 2-isopropyl-2-oxazoline was added to the calcium hexammoniate slurry in lieu of 2-n-propyl-2-oxazoline.

Polymerization of 264 g. (6.0 mols) of ethylene oxide with the above catalyst for 15 hours gave 181 g. of a free-flowing, white resin having an intrinsic viscosity of 8.90 in water, corresponding to an approximate molecular weight of 1,700,000.

EXAMPLE XII

To the apparatus described in Example II, except that the resin flask was four liters in volume, was added 200 ml. of anhydrous ammonia. Then 750 ml. of dry n-heptane was added before addition of 4.0 g. (0.1 mol) of calcium metal nodules to form a deep blue slurry of calcium hexammoniate. The slurry was stirred well for 15–20 minutes and diluted with an additional 1,250 ml. of dry n-heptane before a solution of 4.25 g. (0.05 mol) of 2-methyl-2-oxazoline in 50 ml. n-heptane was added dropwise. After the addition the excess ammonia was allowed to evaporate, leaving a gray-white slurry of the catalyst in n-heptane.

When the temperature of the above catalyst slurry reached +15° C., 703 g. (16.0 mols) of liquid ethylene oxide was added in bulk. Polymerization was continued for 15 hours. The resulting polymer, a solid, while cake, was broken up and filtered. After drying in a vacuum oven at 30° C. to a constant weight, 541 g. of a fluffy, white solid was recovered. This solid had an intrinsic viscosity in water of 8.80, corresponding to a molecular weight of 1,700,000.

EXAMPLE XIII

A catalyst was prepared as in Example XII except that 6.5 g. (0.05 mol) of 2-t-butyl-2-oxazoline was added to the calcium hexammoniate slurry in lieu of 2-methyl-2-oxazoline.

Polymerization of 615 g. (14.0 mols) of ethylene oxide with this catalyst for a 15-hour period gave 560 g. of a free-flowing, granular, white resin having an intrinsic viscosity of 9.50 in water, corresponding to an approximate molecular weight of 1,800,000.

EXAMPLE XIV

A catalyst was prepared as in Example XII except that 5.0 g. (0.05 mol) of 2-ethyl-2-oxazoline was added to the calcium hexammoniate slurry in place of 2-methyl-2-oxazoline.

Polymerization of 790 g. (18.0 mols) of ethylene oxide with this catalyst for a 15-hour period gave 473 g. of a fine, white, fluffy polymer which had an intrinsic viscosity in water of 7.60, corresponding to a molecular weight of 1,350,000.

The following two examples illustrate the prior art catalyst compositions and polymerization method. It will be noted that the yields of product in these examples are significantly less than when the process of our invention is followed using our catalyst.

EXAMPLE XV

A catalyst was prepared as in Example XVI except that no oxazoline or other co-catalyst was added to the calcium hexammoniate slurry.

Polymerization of 615 g. (14.0 mols) of ethylene oxide with this catalyst for 15 hours gave 176 g. of white, granular, free-flowing polymeric resin having an intrinsic viscosity of 5.25 in water, corresponding to a molecular weight of 850,000.

EXAMPLE XVI

A catalyst was prepared in the same manner as set forth in Example XIV except that a mixture of 2.0 g. (0.049 mol) of acetonitrile and 2.9 g. (0.05 mol) of propylene oxide was added in lieu of 4.25 g. of 2-methyl-2-oxazoline. During the addition the initially blue-black colored slurry turned gray-white.

Polymerization of 615 g. (14.0 mols) of ethylene oxide with the above catalyst for 15 hours gave 117 g. of a slightly yellow, free-flowing powder which had an intrinsic viscosity in water of 0.99, corresponding to a molecular weight of 99,000.

EXAMPLE XVII

A catalyst was prepared as in Example XII except that 13.7 g. (0.10 mol) of barium metal was added in place of calcium to form the hexammoniate.

Polymerization of 615 g. (14.0 mols) of ethylene oxide with this catalyst for 15 hours at 20° C. gave 107.5 g. of white, granular polyethylene oxide.

Examples XVIII and XIX illustrate the embodiment wherein the alternate procedure of producing the catalyst is used to prepare the higher molecular weight poly(ethylene oxide).

EXAMPLE XVIII

To the apparatus described in Example XII was added 500 ml. of dry n-heptane and 3.0 g. (0.075 mol) of calcium metal nodules. Excess ammonia was then condensed into the flask until the calcium had completely reacted. A deep blue slurry of the hexammoniate resulted after one hour. A solution of 3.22 g. (0.038 mol) of 2-methyl 2-oxazoline in 50 ml. dry n-heptane was then added slowly. After the addition the reaction mixture was a gray, granular slurry.

The ammonia excess was evaporated until the reaction mixture reached a temperature of +15° C. Liquid ethylene oxide, 615 g. (14.0 mols), was added in bulk over a five-minute period and stirring was continued with dry ice condenser cooling. The polymerization was allowed to run for twelve hours. A total of 416 g. of coarse, white, free-flowing poly(ethylene oxide) was obtained. The molecular weight of this polymer was approximately 2,600,000.

EXAMPLE XIX

A catalyst was prepared as in Example XVIII except that only 2.0 g. (0.05 mol) of calcium metal and 2.15 (0.025 mol) of 2-methyl-2-oxazoline were used.

Polymerization of 615 g. (14.0 mols) of ethylene oxide with this catalyst for 20 hours at 20° C. gave 322 g. of coarse, white, granular polymer having a molecular weight of approximately 3,200,000.

EXAMPLE XX

A catalyst was prepared as in Example XVIII except that 3.8 g. (0.038 mol) of 2-methyl-2-oxazine was used in lieu of 2-methyl-2-oxazoline.

Polymerization of 615 g. (14.0 mols) of ethylene oxide with this catalyst for 20 hours at 20° C. gave 321 g. of coarse, white, granular poly(ethylene oxide) which had an approximate molecular weight of 2,500,000.

EXAMPLE XXI

A catalyst was prepared as in Example I except that 7.7 g. (0.034 mol) of 2,2'-tetra-methylene-bis-(5-methyl-2-oxazoline) was used in lieu of 2,5-dimethyl-2-oxazoline.

Also as in Example I, 15 ml. of the above catalyst suspension in dry cyclohexane was used to polymerize 44.0 g. (1.0 mol) of liquid ethylene oxide. After a 15-hour reaction period, the polymeric product was filtered and dried in a vacuum oven. A total of 30.3 g. of poly (ethylene oxide) was obtained.

What is claimed is:

1. A process for the polymerization of ethylene oxide which comprises contacting ethylene oxide, under substantially anhydrous conditions, with from about 0.02 to about 10 wt. percent, based upon the ethylene oxide, of a catalyst prepared by mixing and reacting with an alkaline earth metal hexammoniate a cyclic imino ether of the formula:

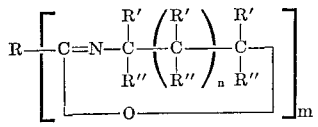

where R is hydrogen or an organic hydrocarbon radical, R' and R'', taken individually, is hydrogen or a lower alkyl group, $n$ is 0 or 1, and $m$ is an integer corresponding to the valence of R, said cyclic imino ether being added in the amount of 0.1 to about 1.0 mol per mol of calcium present in the liquid ammonia at a temperature in the range of from $-30°$ C. to about $150°$ C. for a period of time sufficient to produce a polymer and recovering said polymer from the reaction mixture.

2. The process of claim 1 wherein the alkaline earth metal is calcium, $m$ is 1 and R'' is hydrogen.

3. The process of claim 2 wherein the cyclic imino ether is 2-methyl-2-oxazoline.

4. The process of claim 2 wherein the cyclic imino ether is 2-ethyl-2-oxazoline.

5. The process of claim 2 wherein the cyclic imino ether is 2,5-dimethyl-2-oxazoline.

References Cited

UNITED STATES PATENTS

| | | | |
|---|---|---|---|
| 2,971,988 | 2/1961 | Hill et al. | 260—632 |
| 3,037,943 | 6/1962 | Hill et al. | 260—2 |
| 3,062,755 | 11/1962 | Hill et al. | 260—2 |
| 3,127,358 | 3/1964 | Hill et al. | 260—2 |
| 3,167,519 | 1/1965 | Hill et al. | 260—2 |
| 3,141,854 | 7/1964 | Bailey et al. | 252—428 |

WILLIAM H. SHORT, Primary Examiner

E. NIELSEN, Assistant Examiner

U.S. Cl. X.R.

252—428; 260—307, 615